UNITED STATES PATENT OFFICE.

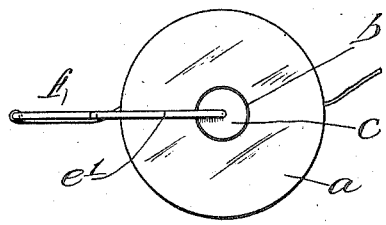
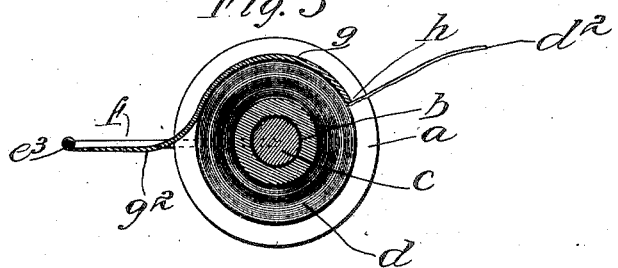
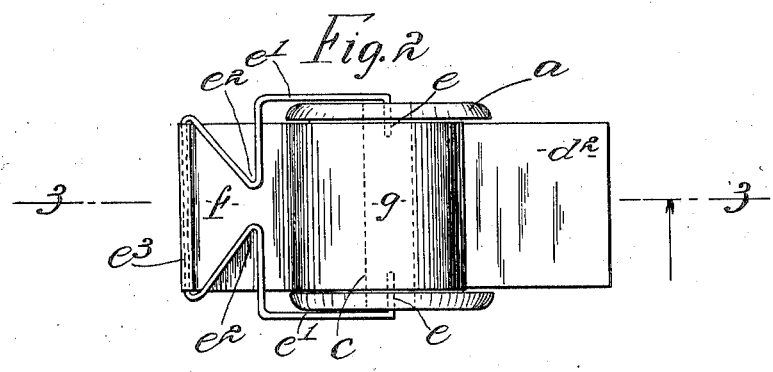

BERNARD J. RILEY, OF HARRISON, NEW JERSEY, ASSIGNOR TO DENNISON MFG. COMPANY, OF NEW YORK, N. Y., A CORPORATION OF MASSACHUSETTS.

SPOOL OR REEL FOR TAPE OR THE LIKE.

947,997.  Specification of Letters Patent.  Patented Feb. 1, 1910.

Application filed July 28, 1909. Serial No. 509,964.

*To all whom it may concern:*

Be it known that I, BERNARD J. RILEY, a citizen of the United States, and residing at Harrison, in the county of Hudson and State of New Jersey, have invented certain new and useful Improvements in Spools or Reels for Tape and the Like, of which the following is a specification, such as will enable those skilled in the art to which it appertains to make and use the same.

This invention relates to holders for spools or reels and particularly for spools or reels on which adhesive tape or like material is wound; and the object of the invention is to provide an improved device of this class having a handle member by which it may be manipulated and the spool or reel supported, and which is also provided with a friction device for holding the spool or reel stationary and by means of which a piece may be cut from the adhesive tape wound on said spool or reel.

The invention is fully disclosed in the following specification, of which the accompanying drawing forms a part, in which the different parts of my improvement are designated by suitable reference characters in each of the views, and in which;—

Figure 1 is a side view of a device of the class specified involving my invention;—Fig. 2 a plan view thereof, and;—Fig. 3 a sectional view on the line 3—3 of Fig. 2.

In the drawing forming part of this specification I have shown at $a$ an ordinary spool or reel having a central bore $b$ in which is preferably placed a plug $c$ and in practice an adhesive or other tape $b$ may be wound on the spool or reel in the usual or any preferred way. I also provide a yoke-shaped handle device $f$ preferably composed of a strong wire or rod and having parallel side members $e^1$ provided with inwardly directed trunnions $e$ which fit in the ends of the plug $c$ and the side portions $e^1$ of the handle member $f$ are provided with inwardly directed projections $e^2$, and said handle device is provided with a cross head or bar $e^3$, and the spool or reel is free to revolve on the plug $c$ or said plug may revolve on the trunnions $e$. I also provide a flat, metal, elastic tension device $g$ consisting of a metal strip $g^2$, one end of which is secured to the cross head $e^3$ of the handle device $f$ and the other end portion of which is passed forwardly under the inwardly directed projections $e^2$ of the side portions of the handle device, and up between said inwardly directed projections and the spool or reel, and forwardly over said spool or reel, and curved transversely so as to fit on and bear on the body portion of said spool or reel or on the tape wound thereon as clearly shown in Figs. 2 and 3. The front end portion of the tension device $g$ terminates at a point opposite of the handle device $f$ and is provided with a cutting device $h$.

In the operation of this device the tape is first wound on the spool or reel and said spool or reel is placed in position in the holder, as shown in the drawing. The holder is composed of spring metal, and in placing the spool or reel therein all that is necessary is to separate the side arms or members $c^1$ in order that the spool or reel may be placed between the same, and in this operation the tension device $g$ is raised until the spool or reel is inserted, after which said tension device bears on the spool or reel and prevents the accidental rotation thereof so as to unwind the tape therefrom. When it is desired to remove a piece of tape for use the spool or reel is held in one hand by means of the handle member $f$ and the free end $d^2$ of the tape is grasped with the thumb and fingers of the other hand, and the desired length of said tape is pulled out or reeled off of the spool or reel, and by giving the end of said tape a quick upward pull it will be torn off on the edge $h$ of the tension device $g$ as will be readily understood.

This device is particularly adapted for use with transparent adhesive paper tape, but may be used with other forms of tape.

My invention is not limited to the use of the plug $c$ in the spool, or reel, nor to the particular means for mounting the spool or reel in the side members $e^1$ of the handle device; and various changes in and modifications of these features of the construction may be made, within the scope of the appended claims, without departing from the spirit of my invention or sacrificing its advantages.

Having fully described my invention what I claim as new, and desire to secure by Letters Patent is;—

1. A holder and friction device for spools or reels, comprising a yoke-shaped handle member having a cross head and parallel projecting arms, said arms being provided with inwardly directed trunnions and adjacent to the cross head with inwardly directed projections, and a flat spring tension device, one end of which is secured to said cross head and the other end portion of which is passed forwardly under said projections and upwardly and forwardly in front of said projections and the front end portion of which is segmentally curved transversely thereof.

2. A spool or reel provided with a holder and friction device, comprising a yoke-shaped handle member having a cross head and parallel arms provided with inwardly directed trunnions, said arms being provided adjacent to the cross head with inwardly directed projections and a flat tension spring device, one end of which is secured to the cross head of the handle member and the other end portion of which is passed forwardly under said projections and upwardly over the spool or reel so as to bear thereon.

In testimony that I claim the foregoing as my invention I have signed my name in presence of the subscribing witnesses this 27th day of July 1909.

BERNARD J. RILEY.

Witnesses:
CHAS. E. MORRIS,
E. P. BALDWIN.